United States Patent
Kato et al.

(10) Patent No.: US 9,482,924 B2
(45) Date of Patent: Nov. 1, 2016

(54) COLORED COMPOSITION AND IMAGE DISPLAY STRUCTURE

(71) Applicant: FUJIFILM CORPORATION, Minato-ku, Tokyo (JP)

(72) Inventors: Takashi Kato, Shizuoka-ken (JP); Yasuhiro Ishiwata, Shizuoka-ken (JP); Hiroyuki Naito, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 255 days.

(21) Appl. No.: 14/295,341

(22) Filed: Jun. 4, 2014

(65) Prior Publication Data

US 2014/0285868 A1    Sep. 25, 2014

Related U.S. Application Data

(63) Continuation of application No. PCT/JP2012/081218, filed on Nov. 22, 2012.

(30) Foreign Application Priority Data

Dec. 15, 2011  (JP) ................................. 2011-274853

(51) Int. Cl.
*C09D 11/037* (2014.01)
*C09D 11/322* (2014.01)
(Continued)

(52) U.S. Cl.
CPC ............. *G02F 1/167* (2013.01); *C09B 55/009* (2013.01); *C09B 67/0083* (2013.01); *G02B 26/005* (2013.01); *G02F 2001/1678* (2013.01)

(58) Field of Classification Search
CPC ... C09D 11/037; C09D 11/322; C09D 11/52; C09B 55/009; C09B 67/008; C09B 67/0083; G02B 26/005; G02F 1/167; G02F 2001/1678
USPC ............. 106/31.75, 31.78; 252/500; 359/290
See application file for complete search history.

(56) References Cited

U.S. PATENT DOCUMENTS 8,520,286 B2 *  8/2013  Clapp .................. G02B 26/005
                                                            252/586
8,717,663 B2 *  5/2014  Heikenfeld .......... G02B 26/005
                                                            252/586
(Continued)

FOREIGN PATENT DOCUMENTS

JP          2002-256164 A      9/2002
JP          2003-96327 A       4/2003
(Continued)

OTHER PUBLICATIONS

English translation of JP 2007/262165; Oct. 2007; 41 pages.*
English translation of JP 2010/260941; Nov. 2010; 54 pages.*
English translation of JP 2011/116898; Jun. 2011; 59 pages.*
Japanese Office action dated Sep. 15, 2015, with the English translation corresponding to the instant patent application.
(Continued)

*Primary Examiner* — Helene Klemanski
(74) *Attorney, Agent, or Firm* — SOLARIS Intellectual Property Group, PLLC

(57) ABSTRACT

A colored composition includes: an azomethine pigment represented by the following Formula (1) and having a solubility in n-hexane of 1% by mass or more at 25° C. and 0.1 MPa; and a non-polar solvent:

Formula (1)

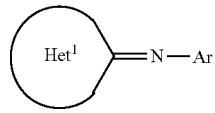

wherein, in Formula (1), $Het^1$ represents a ring having no dissociable group and Ar represents an aromatic ring having no dissociable group or a saturated heterocycle having no dissociable group.

6 Claims, 1 Drawing Sheet

(51) Int. Cl.
  *C09D 11/52*   (2014.01)
  *C09B 55/00*   (2006.01)
  *G02B 26/00*   (2006.01)
  *G02F 1/167*   (2006.01)
  *C09B 67/44*   (2006.01)

(56) References Cited

U.S. PATENT DOCUMENTS

| | | | | |
|---|---|---|---|---|
| 8,854,714 B2* | 10/2014 | Clapp | .................. | G02B 26/004 |
| | | | | 252/586 |
| 9,075,281 B2* | 7/2015 | Kato | .................. | C09B 67/0083 |
| 2010/0292450 A1 | 11/2010 | Shiga et al. | | |
| 2013/0241815 A1 | 9/2013 | Ishida et al. | | |

FOREIGN PATENT DOCUMENTS

| | | |
|---|---|---|
| JP | 2006-016564 | 1/2006 |
| JP | 2007-262165 | 10/2007 |
| JP | 2009-138189 | 6/2009 |
| JP | 2010-260941 | 11/2010 |
| JP | 2011-116898 | 6/2011 |
| WO | 2010/104606 A1 | 9/2010 |
| WO | 2011/111710 | 9/2011 |

OTHER PUBLICATIONS

Chinese Office action dated Nov. 13, 2015, with the partial English translation corresponding to the instant patent application.
English language translation of the following: Office action dated Feb. 3, 2015 from the JPO in a Japanese patent application corresponding to the instant patent application. This office action translation is submitted now in order to supplement the understanding of the cited references which are being disclosed in the instant Information Disclosure Statement.
Nature (London), 425, 383 (2003).
Wendell F. Smith, Jr. etc., "Quenching of Singlet Molecular Oxygen inSolution by Azomethine Dyes", Journal of the American Chemical Society, vol. 97, May 14, 1975, p. 2764-2770.
Written Opinion of the ISA issued in International Application No. PCT/JP2012/081218 on Feb. 18, 2014.
International Search Report issued in International Application No. PCT/JP2012/081218 on Feb. 18, 2014.
Office action dated Jun. 11, 2015, from the SIPO in a Chinese patent application corresponding to the instant patent application.
Chinese Office Action dated May 26, 2016, with partial English translation, in a Chinese application corresponding to the instant patent application.

* cited by examiner

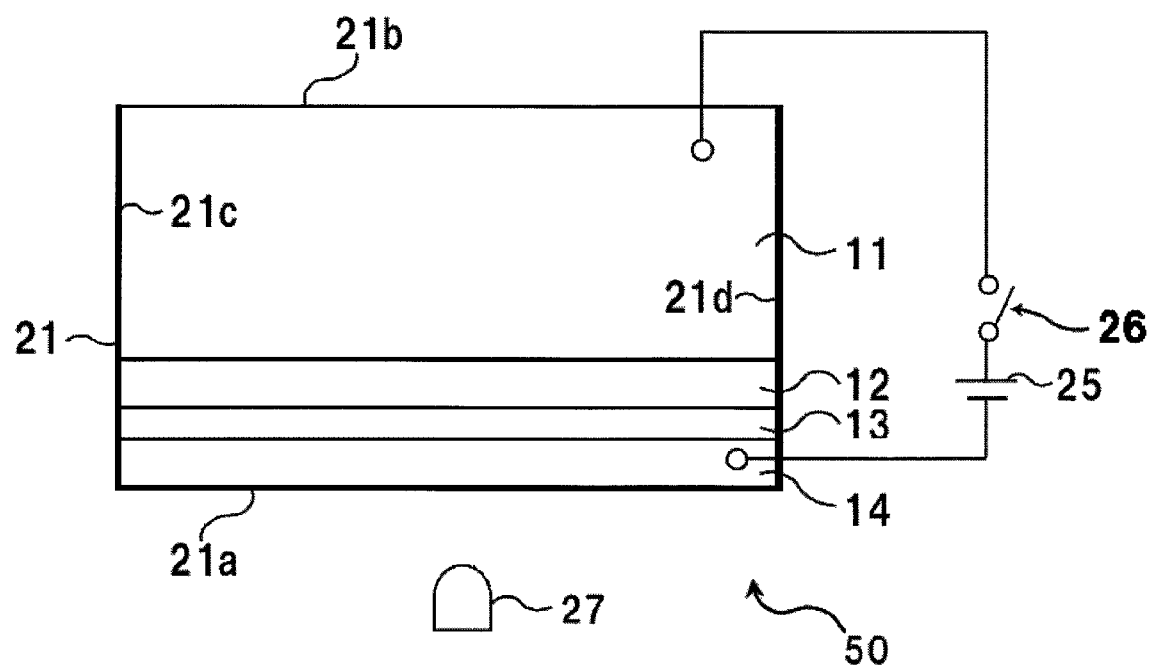

COLORED COMPOSITION AND IMAGE DISPLAY STRUCTURE

CROSS-REFERENCE TO RELATED APPLICATION

This application is a continuation application of International Application No. PCT/JP2012/081218, filed on Nov. 22, 2012, which is incorporated herein by reference. Further, this application claims priority from Japanese Patent Application No. 2011-274853, filed on Dec. 15, 2011.

TECHNICAL FIELD

The present invention relates to a colored composition including an azomethine pigment and an image display structure.

BACKGROUND ART

Recently, organic pigments have been widely used in display materials, optical recording media, materials for inkjetting, and the like. When a pigment is used in a coating process or an inkjet process, a pigment having high solubility in a solvent in addition to having a high molar absorption coefficient is required in order to improve coloring efficiency.

As a new image display technology, displays using an electrowetting method (EWD) have recently been receiving attention (see, for example, Nature (London), 425, 383 (2003)). The display has an image display mode that is operated by disposing, on a substrate, plural pixels filled with two phases, which are a hydrophilic medium and an oil colored ink, controlling the affinity at the interface of the hydrophilic medium/oil colored ink by ON/OFF control of voltage application to each pixel, and developing/modifying the oil colored ink on the substrate. Pigments used in a display manufactured by the electrowetting method are required to have high solubility in a hydrocarbon-based solvent.

Various pigments are known, and among these, an azomethine pigment has been widely used as a dye for photography (see, for example, Journal of the American Chemical Society, Volume 97, page 2764, 1975).

Further, pyrrolo triazole-based and pyrazolo triazole-based azomethine pigments, and the like having excellent absorption properties or toughness have been proposed as an azomethine pigment (see, for example, Japanese Patent Application Laid-Open (JP-A) No. 2003-96327 and JP-A No. 2002-256164).

SUMMARY OF INVENTION

Technical Problem

However, solubility in a non-polar solvent and, in particular, solubility in a hydrocarbon-based solvent such as decane or hexane cannot be sufficiently secured in the above described azomethine pigment as conventionally proposed. For this reason, for example, when the azomethine pigment is applied to an image display using the principles of an electrowetting method or an electrophoresis method, problems in the display changeover of the image (optical shutter), for example, have occurred, and further improvements are required.

An object of the invention is to provide a colored composition in which an azomethine pigment is well dissolved and contained, and which is appropriate for an image display (in particular an image display in a display device which operates in accordance with the principles of an electrowetting method or an electrophoresis method (for example, as regards ON/OFF properties (optical shutter properties) during image display)), and an image display structure, and the problem to be solved is to achieve this object.

Solution to Problem

Specific means for solving the problem are as follows.
<1> A colored composition comprising:
an azomethine pigment represented by the following Formula (1) and having a solubility in n-hexane of 1% by mass or more at 25° C. and 0.1 MPa; and
a non-polar solvent:

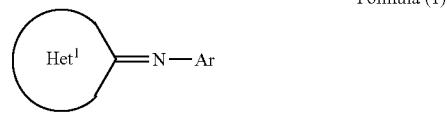

Formula (1)

wherein, in Formula (1), $Het^1$ represents a ring having no dissociable group and Ar represents an aromatic ring having no dissociable group or a saturated heterocycle having no dissociable group.

<2> The colored composition according to <1>, wherein the azomethine pigment is a compound represented by the following Formula (2):

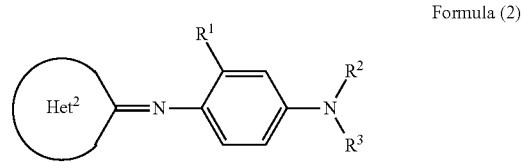

Formula (2)

wherein, in Formula (2), $Het^2$ represents a coupler mother nucleus having no dissociable group; $R^1$ represents a hydrogen atom, an alkyl group, an alkoxy group, or an aryl group; $R^2$ and $R^3$ each independently represent an alkyl group or an aryl group; and none of $R^1$, $R^2$ and $R^3$ has a dissociable group.

<3> The colored composition according to <1> or <2>, wherein the azomethine pigment is a compound represented by at least one selected from the group consisting of the following Formula (3), Formula (4), Formula (5) and Formula (6):

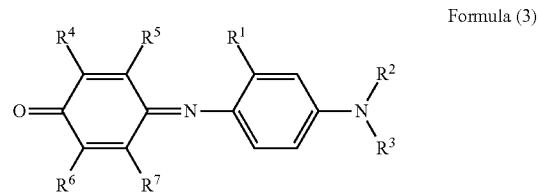

Formula (3)

wherein in Formula (3), $R^1$ represents a hydrogen atom, an alkyl group, an alkoxy group, or an aryl group; $R^2$ and $R^3$ each independently represent an alkyl group or an aryl group; $R^4$, $R^5$, $R^6$ and $R^7$ each independently represent a hydrogen atom, an alkyl group, an alkoxy group, an aryl group, —COOR$^{11}$, or —CONR$^{11}$R$^{12}$; R$^4$, R$^5$, R$^6$ and R$^7$ are combined with each other to form an aromatic ring; R$^{11}$ and R$^{12}$ each independently represent a hydrogen atom, an alkyl group, or an aryl group; R$^{11}$ and R$^{12}$ are combined with each other to form a 5-membered ring, a 6-membered ring, or a 7-membered ring; and none of R$^1$ to R$^7$ has a dissociable group;

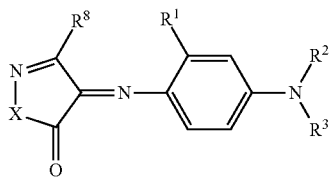

Formula (4)

wherein in Formula (4), R$^1$ represents a hydrogen atom, an alkyl group, an alkoxy group, or an aryl group; R$^2$ and R$^3$ each independently represent an alkyl group or an aryl group; R$^8$ represents an alkyl group, an alkoxy group, an aryl group, a cyano group, —COOR$^{11}$, or —CONR$^{11}$R$^{12}$; X represents an oxygen atom or N—R$^{13}$; R$^{11}$, R$^{12}$ and R$^{13}$ each independently represent a hydrogen atom, an alkyl group, or an aryl group; R$^{11}$ and R$^{12}$ are combined with each other to form a 5-membered ring, a 6-membered ring, or a 7-membered ring; and none of R$^1$ to R$^3$ and R$^8$ has a dissociable group;

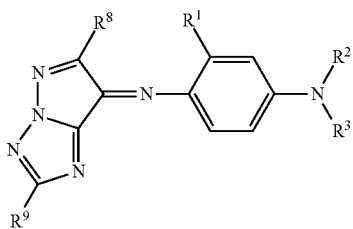

Formula (5)

wherein in Formula (5), R$^1$ represents a hydrogen atom, an alkyl group, an alkoxy group, or an aryl group; R$^2$ and R$^3$ each independently represent an alkyl group or an aryl group; R$^8$ and R$^9$ each independently represent an alkyl group, an alkoxy group, an aryl group, a cyano group, —COOR$^{11}$, or —CONR$^{11}$R$^{12}$; R$^{11}$ and R$^{12}$ each independently represent a hydrogen atom, an alkyl group, or an aryl group; R$^{11}$ and R$^{12}$ are combined with each other to form a 5-membered ring, a 6-membered ring, or a 7-membered ring; and none of R$^1$ to R$^3$ and R$^8$ to R$^9$ has a dissociable group; and

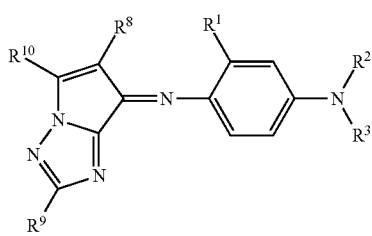

Formula (6)

wherein in Formula (6), R$^1$ represents a hydrogen atom, an alkyl group, an alkoxy group, or an aryl group; R$^2$ and R$^3$ each independently represent an alkyl group or an aryl group; R$^8$ and R$^9$ each independently represent an alkyl group, an alkoxy group, an aryl group, a cyano group, —COOR$^{11}$, or —CONR$^{11}$R$^{12}$; R$^{10}$ represents an alkyl group, an alkoxy group, an aryl group, —COOR$^{11}$, or —CONR$^{11}$R$^{12}$; R$^{11}$ and R$^{12}$ each independently represent a hydrogen atom, an alkyl group or an aryl group; R$^{11}$ and R$^{12}$ are combined with each other to form a 5-membered ring, a 6-membered ring, or a 7-membered ring; and none of R$^1$ to R$^3$ and R$^8$ to R$^{10}$ has a dissociable group.

<4> The colored composition according to any one of <1> to <3>, wherein a viscosity of the colored composition at 20° C. is 10 mPa·s or less (preferably, 0.01 mPa·s or more).

<5> The colored composition according to any one of <1> to <4>, wherein the colored composition is used in an image display material of a display device which operates in accordance with a principle of an electrowetting method or an electrophoresis method.

<6> An image display structure comprising:
a hydrophobic polymer layer having a hydrophobic surface;
an oil layer which is disposed in contact with the hydrophobic surface and is formed using the colored composition according to any one of <1> to <5>; and
a hydrophilic liquid layer which is disposed in contact with the oil layer.

Advantageous Effects of Invention

According to the invention, a colored composition in which an azomethine pigment is well dissolved and contained and which is appropriate for an image display (in particular, an image display in a display device which operates in accordance with the principles of an electrowetting method or an electrophoresis method (for example, as regards ON/OFF properties (optical shutter properties) during image display)), and an image display structure, are provided.

BRIEF DESCRIPTION OF DRAWINGS

FIG. 1 is a schematic cross-sectional view illustrating an example of the configuration of a display device which operates in accordance with the principles of an electrowetting method.

DESCRIPTION OF EMBODIMENTS

Hereinafter, a colored composition of the invention and an image display structure using the same are described in detail.

<Colored Composition>

The colored composition of the invention is composed of an azomethine pigment represented by Formula (1) shown below and having a solubility in n-hexane of 1% by mass or more at 25° C. and 0.1 MPa, and a non-polar solvent. In addition, the colored composition of the present invention may be composed by further using other components including a pigment other than the azomethine pigment, a polar solvent, an additive such as an ultraviolet absorber, and the like, if necessary.

Azomethine pigments are widely known in the related art and have been used in image applications (for example, in the field of photography); however, conventional azomethine pigments have low solubility in a non-polar solvent and, therefore, are not generally used as a colorant in a liquid composition including a non-polar solvent.

In the invention, an azomethine pigment having a specific structure in which no dissociable group is present (preferably, having an alkyl group having 6 or more carbon atoms), is used as a colorant in a colored composition including a non-polar solvent, whereby favorable solubility is maintained without causing precipitation, and an image display (in particular, an image display in a display device which operates in accordance with the principles of an electrowetting method or an electrophoresis method) is improved. In particular, a clear image display having excellent ON/OFF properties (optical shutter properties) during image display and favorable color can be realized.

—Azomethine Pigment—

The colored composition according to the invention includes at least one azomethine pigment represented by the following Formula (1) and having a solubility in n-hexane of 1% by mass or more at 25° C. and 0.1 MPa. The pigment has excellent solubility in a non-polar solvent, and thus is suitable as a pigment used in displays and the like, in particular, a display device that operates in accordance with the principle of an electrowetting method and a display that operates in accordance with an electrophoresis method.

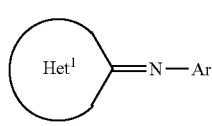

Formula (1)

In Formula (1), $Het^1$ represents a ring having no dissociable group and Ar represents an aromatic ring having no dissociable group or a saturated heterocycle having no dissociable group. It is preferred that the azomethine pigment has at least one linear or branched alkyl group (preferably a linear alkyl group) having a relatively high carbon number such as 6 to 30 carbon atoms in a molecule thereof.

The azomethine pigment represented by Formula (1) has a solubility in n-hexane of 1% by mass or more at 25° C. and 0.1 MPa and excellent solubility in a non-polar solvent, particularly, a hydrocarbon-based solvent. A solubility of 1% by mass or more indicates that the pigment is applicable to a member for display (for example, an image display structure described below) for manufacturing a display which operates, for example, in accordance with the principle of an electrowetting method, or an electrophoresis method as a material for image display.

Hereinafter, "a solubility in n-hexane at 25° C. and 0.1 MPa" of a pigment is also simply referred to as "solubility".

When the azomethine pigment according to the invention is applied to an image display material for manufacturing a display which operates in accordance with the principle of an electrowetting method or a display which operates in accordance with an electrophoresis method [for example, a member for display, such as an optical shutter which changes an image display structure (for example: ON/OFF state of a pixel (a state of image display/non-display) or a color display layer (color filter) of a display device which operates in accordance with an electrophoresis method)], the solubility is preferably 3% by mass or more and more preferably 5% by mass or more. The higher the solubility, the better, but, generally, the solubility is approximately 80% by mass or less.

Hereinafter, the azomethine pigment represented by Formula (1) is described in detail.

The azomethine pigment represented by Formula (1) is a pigment having no dissociable group (including no NH group) such as —$SO_3H$, —$PO_3H_2$, —$CO_2H$ and —OH in a molecule thereof, and exhibits good solubility in a non-polar solvent. From the viewpoint of better solubility is in a non-polar solvent, it is preferred that the azomethine pigment has a linear or branched alkyl group having 6 to 30 carbon atoms in a molecule thereof. It is presumed that the SP value (solubility parameter) of the azomethine pigment represented by Formula (1) is close to the SP value of a non-polar solvent due to the characteristics in the structure, and thus the miscibility with a solvent is improved.

When the azomethine pigment has the linear or branched alkyl group in a molecule thereof, the alkyl group is a linear or branched alkyl group having preferably 6 to 20 carbon atoms and more preferably 6 to 10 carbon atoms for the same reason as described above.

Examples of the ring represented by $Het^1$ in Formula (1) include a 5- or 6-membered hydrocarbon ring and a 5- or 6-membered heterocycle. Examples of the ring include a benzene ring, a pyrazole ring, an isoxazole ring, a pyrazolotriazole ring, a pyrrolotriazole ring, a naphthalene ring, a pyridone ring, and a barbituric ring and the like.

The ring represented by $Het^1$ may be unsubstituted or substituted. A substituent in which $Het^1$ is substituted may be appropriately selected from substituents, except for a dissociable group. Specific examples of the substituent include an alkyl group, an alkoxy group, an aryl group, —$COOR^{11}$ and —$CONR^{11}R^{12}$ [$R^{11}$ and $R^{12}$ each independently represent a hydrogen atom, an alkyl group or an aryl group, and $R^{11}$ and $R^{12}$ may be combined with each other to form a 5-membered ring, a 6-membered ring or a 7-membered ring.]. Note that the alkyl group, the alkoxy group, the aryl group, —$COOR^{11}$ and —$CONR^{11}R^{12}$ each have the same definition as an alkyl group, an alkoxy group, an aryl group, —$COOR^{11}$ and —$CONR^{11}R^{12}$ in $R^4$ to $R^7$ of Formula (3) described below, and preferred aspects thereof are also the same.

The aromatic ring or saturated heterocycle represented by Ar is preferably a 5-membered or 6-membered ring, and preferable examples thereof include an aromatic ring such as a benzene ring, a naphthalene ring, a pyrrole ring, an indole ring, a pyridine ring, a quinoline ring, a pyrazine ring, a quinoxalin ring, a thiazole ring, a thiazoline ring, an oxazole ring, an oxazoline ring, or an imidazole ring, and a saturated heterocycle such as a pyrrolidine ring, tetrahydrofuran, tetrahydrothiophene, thiazoline, oxazoline, or imidazoline.

Among them, a benzene ring, a pyrrole ring and an indole ring are more preferable as Ar.

The aromatic ring or saturated heterocycle represented by Ar may be unsubstituted or substituted. A substituent with which Ar is substituted may be appropriately selected from substituents, except for a dissociable group, and specific examples thereof include an alkyl group, an alkoxy group, an aryl group, and a halogen atom. The alkyl group, the alkoxy group, and the aryl group each have the same definition as an alkyl group, an alkoxy group, and an aryl group in $R^1$ of Formula (2) described below, and preferred aspects thereof are also the same.

Among the above azomethine pigments represented by Formula (1), an azomethine pigment represented by the following Formula (2) is preferred.

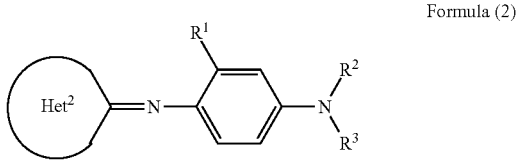

Formula (2)

In Formula (2), Het² represents a coupler mother nucleus having no dissociable group. The coupler mother nucleus represented by Het² is a molecular structure which is necessary for a pigment to exhibit color (chromophore (parent skeleton)). That is, the coupler mother nucleus is a partial structure including a continuous unsaturated bond in a compound (partial structure necessary to form a conjugated system), and is a structural part in which, for example, an aromatic group, >C=C<, >C=O, >C=N—, >N=N< or the like is linked. Specific examples of the coupler mother nucleus include an isoxazolone skeleton, a pyrazolone skeleton, a pyrazolotriazole skeleton, a pyrrolotriazole skeleton, a benzoquinone skeleton, a naphthoquinone skeleton, a pyridone skeleton, a barbituric skeleton, a pyrimidine skeleton, a thiobarbituric skeleton, and an anilide skeleton.

Specifically, a molecular skeleton including a 5- or 6-membered hydrocarbon ring or a 5- or 6-membered heterocycle is preferable as a coupler mother nucleus, and examples of the hydrocarbon ring or heterocycle include a benzene ring, a pyrazole ring, an isoxazole ring, a pyrazolotriazole ring, a pyrrolotriazole ring, a naphthalene ring, a pyridone ring, a barbituric ring, a thiobarbituric ring, and a pyrimidine ring. Among them, preferable examples of the coupler mother nucleus include a benzene ring, a pyrazole ring, an isoxazole ring, a pyrazolotriazole ring, a pyrrolotriazole ring, and a naphthalene ring.

$R^1$ represents a hydrogen atom, an alkyl group, an alkoxy group or an aryl group. A group represented by $R^1$ does not include a dissociable group.

The alkyl group represented by $R^1$ may be unsubstituted or may have a substituent, and is preferably an alkyl group having 1 to 20 carbon atoms. Preferable examples of the alkyl group include a methyl group, an ethyl group, an n-butyl group, a tertiary butyl group, a 1-methylcyclopropyl group, a 3-heptyl group, a 2-ethylhexyl group, a 2-methylhexyl group, an n-nonyl group, an n-undecyl group, a chloromethyl group, a trifluoromethyl group, an ethoxycarbonylmethyl group, and a perfluoroalkyl group (for example, a perfluoromethyl group). Among them, an alkyl group having 1 to 15 carbon atoms (more preferably 1 to 10 carbon atoms) is more preferred, and a methyl group, an ethyl group, a tertiary butyl group, a hexyl group and a 2-ethylhexyl group are particularly preferred.

The alkoxy group represented by $R^1$ may be unsubstituted or may have a substituent, and is preferably an alkoxy group having 1 to 20 carbon atoms. Preferable examples of the alkoxy group include a methoxy group, an ethoxy group, an n-butoxy group, a tertiary butoxy group, a 3-heptyloxy group, an n-hexyloxy group, a 2-ethylhexyloxy group, an n-nonyloxy group, an n-undecyloxy group, a chloromethyloxy group, a trifluoromethoxy group, an ethoxycarbonylmethoxy group, and a perfluoroalkyloxy group (for example, a perfluoromethoxy group). Among them, an alkoxy group having 1 to 15 carbon atoms (more preferably 1 to 10 carbon atoms) is more preferred, and a methoxy group, an ethoxy group, a hexyloxy group and a 2-ethylhexyloxy group are particularly preferred.

The aryl group represented by $R^1$ may be unsubstituted or may have a substituent, and is preferably an aryl group having 6 to 20 carbon atoms. Preferable examples of the aryl group include a phenyl group, a 4-methoxyphenyl group, a hexyloxyphenyl group, an octyloxyphenyl group, a 2,6-dimethylphenyl group, a 4-dibutylaminophenyl group, a 4-(2-ethylhexanonylaminophenyl) group, and a 4-hexylphenyl group. Among them, an aryl group having 6 to 16 carbon atoms (more preferably 6 to 12 carbon atoms) is more preferred, and a phenyl group is particularly preferred.

$R^2$ and $R^3$ each independently represent an alkyl group or an aryl group. The group represented by $R^2$ and $R^3$ does not include a dissociable group.

The alkyl group represented by $R^2$ or $R^3$ may be unsubstituted or may have a substituent, and is preferably an alkyl group having 1 to 30 carbon atoms. Preferable examples of the alkyl group include a methyl group, an ethyl group, an n-butyl group, a tertiary butyl group, a 1-methylcyclopropyl group, a 3-heptyl group, a 2-ethylhexyl group, a 2-methylhexyl group, an n-nonyl group, an n-undecyl group, a chloromethyl group, a trifluoromethyl group, an ethoxycarbonylmethyl group, and a perfluoroalkyl group (for example, a perfluoromethyl group). Among them, an alkyl group having 6 to 30 carbon atoms is more preferred, an alkyl group having 6 to 20 carbon atoms is even more preferred, and a hexyl group, an octyl group, a 2-ethylhexyl group, a 2-methylhexyl group, and the like are particularly preferred.

The aryl group represented by $R^2$ or $R^3$ may be unsubstituted or may have a substituent, and is preferably an aryl group having 6 to 16 carbon atoms. Preferable examples of the aryl group include a phenyl group, a 4-methoxyphenyl group, a 4-t-butylphenyl group, a 4-dibutylaminophenyl group, a 4-(2-ethylhexanonylaminophenyl) group, and a 4-hexylphenyl group. Among them, an aryl group having 6 to 12 carbon atoms is more preferred, and a phenyl group is particularly preferred.

When each group represented by $R^1$ to $R^3$ has a substituent, examples of the substituent include a halogen atom, an alkyl group, an aryl group, an alkoxy group, and an aryloxy group.

In Formula (2), Het² and at least one group of $R^1$ to $R^3$ in the molecule preferably have a linear or branched alkyl group having a relatively high carbon number such as 6 to 30 carbon atoms. For this reason, the azomethine pigment exhibits good solubility in a non-polar solvent.

From the viewpoint above, it is particularly preferred that, in the structure of Formula (2), $R^1$ is a hydrogen atom, a methyl group or a methoxy group and one or both of $R^2$ and $R^3$ have a structure that represents a linear or branched alkyl group having 6 to 20 carbon atoms (more preferably 6 to 12 carbon atoms).

Among the azomethine pigments represented by Formulas (1) to (2), an azomethine pigment represented by the following Formula (3) is one of preferred compounds.

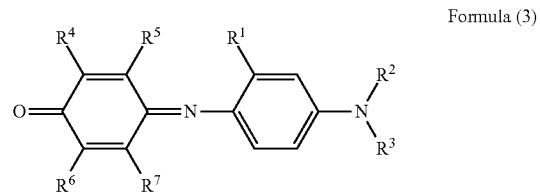

Formula (3)

In Formula (3), $R^1$ represents a hydrogen atom, an alkyl group, an alkoxy group, or an aryl group, and $R^2$ and $R^3$ each independently represent an alkyl group or an aryl group.

$R^1$ and $R^2$ to $R^3$ have the same definition as $R^1$ and $R^2$ to $R^3$ in Formula (2), respectively, and preferred aspects thereof are also the same.

$R^4$, $R^5$, $R^6$ and $R^7$ each independently represent a hydrogen atom, an alkyl group, an alkoxy group, an aryl group, —COOR$^{11}$ or —CONR$^{11}$R$^{12}$. The group represented by $R^4$, $R^5$, $R^6$ and $R^7$ does not include a dissociable group.

The alkyl group represented by $R^4$ to $R^7$ may be unsubstituted or may have a substituent, and is preferably an alkyl group having 1 to 20 carbon atoms. Preferable examples of the alkyl group include a methyl group, an ethyl group, an isopropyl group, an n-butyl group, a tertiary butyl group, a 1-methylcyclopropyl group, a 3-heptyl group, a 2-ethylhexyl group, a 2-methylhexyl group, an n-nonyl group, an n-undecyl group, a chloromethyl group, a trifluoromethyl group, an ethoxycarbonylmethyl group, and a perfluoroalkyl group (for example, a perfluoromethyl group). Among them, an alkyl group having 1 to 16 carbon atoms is more preferred, and a methyl group, an ethyl group, a tertiary butyl group, and a 2-ethylhexyl group are particularly preferred.

The alkoxy group represented by $R^4$ to $R^7$ may be unsubstituted or may have a substituent, and is preferably an alkoxy group having 1 to 20 carbon atoms. Preferable examples of the alkoxy group include a methoxy group, an ethoxy group, an n-butoxy group, a tertiary butoxy group, a 3-heptyloxy group, a 2-ethylhexyloxy group, a 2-methylhexyloxy group, an n-nonyloxy group, an n-undecyloxy group, a chloromethyloxy group, a trifluoromethoxy group, an ethoxycarbonylmethoxy group, and a perfluoroalkyloxy group (for example, a perfluoromethoxy group). Among them, an alkoxy group having 1 to 16 carbon atoms is more preferred, and a methoxy group, an ethoxy group and a 2-ethylhexyloxy group are particularly preferred.

The aryl group represented by $R^4$ to $R^7$ may be unsubstituted or may have a substituent, and is preferably an aryl group having 6 to 20 carbon atoms. Preferable examples of the aryl group include a phenyl group, a 4-methoxyphenyl group, a 4-dibutylaminophenyl group, a 4-(2-ethylhexanoylaminophenyl) group, and a 4-hexylphenyl group. Among them, an aryl group having 6 to 16 carbon atoms is more preferred, and a phenyl group is particularly preferred.

In "—COOR$^{11}$" and "—CONR$^{11}$R$^{12}$" represented by $R^4$ to $R^7$, $R^{11}$ and $R^{12}$ each independently represent a hydrogen atom, an alkyl group or an aryl group, and $R^{11}$ and $R^{12}$ may be combined with each other to form a 5-membered ring, a 6-membered ring or a 7-membered ring. However, the group represented by $R^{11}$ and $R^{12}$ does not include a dissociable group.

The alkyl group represented by $R^{11}$ or $R^{12}$ may be unsubstituted or may have a substituent, and is preferably an alkyl group having 1 to 20 carbon atoms. Preferable examples of the alkyl group include a methyl group, an ethyl group, an ethoxycarbonylmethyl group, an n-butyl group, an n-pentyl group, an n-octyl group, a 2-ethylhexyl group, a dodecyl group, a cyclohexyl group, a cyanoethyl group, a hexadecyl group, an octadecyl group, a 2,2,3,3-tetrafluoropropyl group, a chloroethyl group, an acetoxyethyl group, and a dimethylaminomethyl group. Among them, an alkyl group having 1 to 16 carbon atoms is more preferred, and an n-butyl group and a 2-ethylhexyl group are particularly preferred.

The aryl group represented by $R^{11}$ or $R^{12}$ may be unsubstituted or may have a substituent, and is preferably an aryl group having 6 to 20 carbon atoms. Preferable examples of the aryl group include a phenyl group, a 4-methylphenyl group, a 4-ethylphenyl group, a 4-methoxyphenyl group, a 4-dodecylphenyl group, a 4-(2-ethylhexyloxy)phenyl group, and a 4-dodecyloxyphenyl group. Among them, an aryl group having 6 to 12 carbon atoms is more preferred, and a phenyl group is particularly preferred.

A 5-membered ring, a 6-membered ring and a 7-membered ring formed by combining $R^{11}$ and $R^{12}$ are a nitrogen-containing 5-membered, 6-membered or 7-membered heterocycle including a nitrogen atom, respectively. Preferable examples of the nitrogen-containing heterocycle include a pyrrolidine ring, a piperidine ring, a morpholine ring, a piperazine ring, and a hexamethyleneimine ring.

The 5-membered ring, the 6-membered ring and the 7-membered ring may further have a substituent.

Furthermore, $R^4$ and $R^5$ may be combined with each other to form an aromatic ring, and $R^6$ and $R^7$ may be combined with each other to form an aromatic ring. Further, the formed aromatic ring may have a substituent.

When each group represented by $R^4$ to $R^7$ has a substituent, examples of the substituent include a halogen atom, an alkyl group, an aryl group, an alkoxy group, and an aryloxy group.

In Formula (3), at least one group selected the group consisting of $R^1$ to $R^7$ (including $R^{11}$ to $R^{12}$) in the molecule preferably has a linear or branched alkyl group having a relatively high carbon number such as 6 to 30 carbon atoms. For this reason, the azomethine pigment exhibits good solubility in a non-polar solvent.

From the viewpoint described above, it is particularly preferred that in the structure of Formula (3), $R^1$ is a hydrogen atom, an alkyl group, an alkoxy group or an aryl group, one or both of $R^2$ and $R^3$ have a structure including a linear or branched alkyl group having 6 to 16 carbon atoms (more preferably 6 to 12 carbon atoms), $R^4$ is —COOR$^{11}$ or —CONR$^{11}$R$^{12}$, and each of $R^5$ to $R^7$ is a hydrogen atom.

Further, when $R^4$ represents —COOR$^{11}$, $R^{11}$ is preferably an alkyl group having 4 to 20 carbon atoms and particularly preferably an alkyl group having 4 to 12 carbon atoms. When $R^4$ represents —CONR$^{11}$R$^{12}$, each of $R^{11}$ and $R^{12}$ is preferably a hydrogen atom or an alkyl group having 4 to 20 carbon atoms and particularly preferably a hydrogen atom or an alkyl group having 4 to 12 carbon atoms.

Among the azomethine pigments represented by Formulas (1) to (2), an azomethine pigment represented by the following Formula (4) is one of preferred compounds.

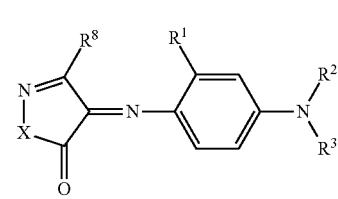

Formula (4)

In Formula (4), $R^1$ represents a hydrogen atom, an alkyl group, an alkoxy group or an aryl group, and $R^2$ and $R^3$ each independently represent an alkyl group or an aryl group.

$R^1$ and $R^2$ to $R^3$ have the same definition as $R^1$ and $R^2$ to $R^3$ in Formula (2), respectively, and preferred aspects thereof are also the same.

$R^8$ represents an alkyl group, an alkoxy group, an aryl group, a cyano group, —COOR$^{11}$ or —CONR$^{11}$R$^{12}$. The group represented by $R^8$ does not include a dissociable group.

The alkyl group, the alkoxy group, and the aryl group represented by $R^8$ each have the same definition as the alkyl group, the alkoxy group, and the aryl group represented by $R^4$ to $R^7$ in Formula (3), and preferred aspects thereof are also the same.

In "—COOR$^{11}$" and "—CONR$^{11}$R$^{12}$" represented by $R^8$, $R^{11}$ and $R^{12}$ each independently represent a hydrogen atom, an alkyl group or an aryl group, and $R^{11}$ and $R^{12}$ may be combined with each other to form a 5-membered ring, a 6-membered ring or a 7-membered ring. $R^{11}$ and $R^{12}$ each have the same definition as $R^{11}$ and $R^{12}$ in $R^4$ to $R^7$ of Formula (3), and preferred aspects thereof are also the same.

X represents an oxygen atom or N—R$^{13}$. $R^{13}$ represents a hydrogen atom, an alkyl group, or an aryl group, and the group represented by $R^{13}$ does not include a dissociable group.

The alkyl group represented by $R^{13}$ may be unsubstituted or may have a substituent, and is preferably an alkyl group having 1 to 20 carbon atoms. Preferable examples of the alkyl group include a methyl group, an ethyl group, an n-butyl group, a tertiary butyl group, a 1-methylcyclopropyl group, an n-hexyl group, a 2-ethylhexyl group, a 2-methylhexyl group, a 3-heptyl group, an n-nonyl group, an n-undecyl group, a chloromethyl group, a trifluoromethyl group, an ethoxycarbonylmethyl group, and a perfluoroalkyl group (for example, perfluoromethyl group). Among them, an alkyl group having 1 to 16 carbon atoms is more preferred, and a methyl group, an ethyl group, a tertiary butyl group and a 2-ethylhexyl group are particularly preferred.

The aryl group represented by $R^{13}$ may be unsubstituted or may have a substituent, and is preferably an aryl group having 6 to 20 carbon atoms. Preferable examples of the aryl group include a phenyl group, a 4-t-butylphenyl group, a 4-methoxyphenyl group, a 4-dibutylaminophenyl group, a 4-2-ethylhexyloxyphenyl group, and a 4-hexylphenyl group. Among them, an aryl group having 6 to 12 carbon atoms is more preferred, and a phenyl group, a 4-t-butylphenyl group, and a 4-2-ethylhexyloxyphenyl group are particularly preferred.

In Formula (4), at least one group selected from the group consisting of $R^1$ to $R^3$, $R^8$ and $R^{11}$ to $R^{13}$ in the molecule preferably has a linear or branched alkyl group having a relatively high carbon number such as 6 to 30 carbon atoms. For this reason, the azomethine pigment exhibits good solubility in a non-polar solvent.

From the viewpoint above, in the structure of Formula (4), it is particularly preferred that $R^1$ is a hydrogen atom, an alkyl group, an alkoxy group or an aryl group, one or both of $R^2$ and $R^3$ are a linear or branched alkyl group having 6 to 16 carbon atoms (more preferably 6 to 12 carbon atoms), $R^8$ is an alkyl group having 6 to 16 carbon atoms (preferably 6 to 12 carbon atoms) or a cyano group, and X is an oxygen atom or N—R$^{13}$ ($R^{13}$ represents an alkyl group having 1 to 12 carbon atoms (preferably 2 to 12 carbon atoms) or an aryl group having 6 to 16 carbon atoms (preferably 6 to 12 carbon atoms).).

Among the azomethine pigments represented by Formulas (1) to (2), an azomethine pigment represented by the following Formula (5) is one of preferred compounds.

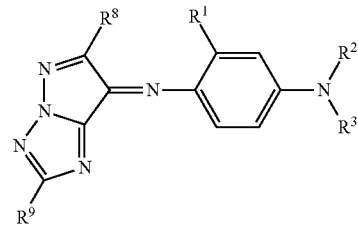

Formula (5)

In Formula (5), $R^1$ represents a hydrogen atom, an alkyl group, an alkoxy group, or an aryl group, and $R^2$ and $R^3$ each independently represent an alkyl group, or an aryl group.

$R^1$ and $R^2$ to $R^3$ each have the same definition as $R^1$ and $R^2$ to $R^3$ in Formula (2), and preferred aspects thereof are also the same.

$R^8$ and $R^9$ each independently represent an alkyl group, an alkoxy group, an aryl group, a cyano group, —COOR$^{11}$ or —CONR$^{11}$R$^{12}$. The group represented by $R^8$ or $R^9$ does not include a dissociable group.

The alkyl group, the alkoxy group, and the aryl group represented by $R^8$ and $R^9$ each have the same definition as the alkyl group, the alkoxy group, and the aryl group represented by $R^4$ to $R^7$ of Formula (3), and preferred aspects thereof are also the same.

In addition, in "—COOR$^{11}$" and "—CONR$^{11}$R$^{12}$" represented by $R^8$ or $R^9$, $R^{11}$ and $R^{12}$ each independently represent a hydrogen atom, an alkyl group, or an aryl group, and $R^{11}$ and $R^{12}$ may be combined with each other to form a 5-membered ring, a 6-membered ring or a 7-membered ring. $R^{11}$ and $R^{12}$ each have the same definition as $R^{11}$ and $R^{12}$ in $R^4$ to $R^7$ of Formula (3), and preferred aspects thereof are also the same.

In Formula (5), at least one group selected from the group consisting of $R^1$ to $R^3$, $R^8$ to $R^9$, and $R^{11}$ to $R^{12}$ in the molecule preferably has a linear or branched alkyl group having a relatively high carbon number such as 6 to 30 carbon atoms. For this reason, the azomethine pigment exhibits good solubility in a non-polar solvent.

From the viewpoint described above, it is particularly preferred that in the structure of Formula (5), $R^1$ is a hydrogen atom, an alkyl group, an alkoxy group, or an aryl group, one or both of $R^2$ and $R^3$ are a linear or branched alkyl group having 6 to 16 carbon atoms (more preferably 6 to 12 carbon atoms), and $R^8$ and $R^9$ are each independently an alkyl group having 1 to 12 carbon atoms (preferably 2 to 12 carbon atoms) or a cyano group.

Among the azomethine pigments represented by Formulas (1) to (2), an azomethine pigment represented by the following Formula (6) is one of preferred compounds.

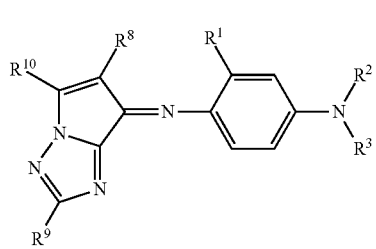

Formula (6)

In Formula (6), $R^1$ represents a hydrogen atom, an alkyl group, an alkoxy group, or an aryl group, and $R^2$ and $R^3$ each independently represent an alkyl group or an aryl group.

$R^1$ and $R^2$ to $R^3$ each have the same definition as $R^1$ and $R^2$ to $R^3$ in Formula (2), and preferred aspects thereof are also the same.

$R^8$ and $R^9$ each independently represent an alkyl group, an alkoxy group, an aryl group, a cyano group, —COOR$^{11}$ or —CONR$^{11}$R$^{12}$. The group represented by $R^8$ or $R^9$ does not include a dissociable group.

The alkyl group, the alkoxy group, and the aryl group represented by $R^8$ and $R^9$ each have the same definition as the alkyl group, the alkoxy group, and the aryl group represented by $R^4$ to $R^7$ in Formula (3), and preferred aspects thereof are also the same.

Furthermore, in "—COOR$^{11}$" and "—CONR$^{11}$R$^{12}$" represented by $R^8$ or $R^9$, $R^{11}$ and $R^{12}$ each independently represent a hydrogen atom, an alkyl group or an aryl group, and $R^{11}$ and $R^{12}$ may be combined with each other to form a 5-membered ring, a 6-membered ring or a 7-membered ring. $R^{11}$ and $R^{12}$ each have the same definition as $R^{11}$ and $R^{12}$ in $R^4$ to $R^7$ of Formula (3), and preferred aspects thereof are also the same.

$R^{10}$ represents an alkyl group, an alkoxy group, an aryl group, —COOR$^{11}$, or —CONR$^{11}$R$^{12}$. The group represented by $R^{10}$ does not include a dissociable group.

The alkyl group, the alkoxy group, and the aryl group represented by $R^{10}$ each have the same definition as the alkyl group, the alkoxy group, and the aryl group represented by $R^4$ to $R^7$ in Formula (3), and preferred aspects thereof are also the same.

Further, in "—COOR$^{11}$" and "—CONR$^{11}$R$^{12}$" represented by $R^{10}$, $R^{11}$ and $R^{12}$ each independently represent a hydrogen atom, an alkyl group, or an aryl group, and $R^{11}$ and $R^{12}$ may be combined with each other to form a 5-membered ring, a 6-membered ring or a 7-membered ring. $R^{11}$ and $R^{12}$ each have the same definition as $R^{11}$ and $R^{12}$ in $R^4$ to $R^7$ of Formula (3), and preferred aspects thereof are also the same.

In Formula (6), at least one group selected from the group consisting of $R^1$ to $R^3$ and $R^8$ to $R^{12}$ in the molecule preferably has a linear or branched alkyl group having a relatively high carbon number such as 6 to 30 carbon atoms. For this reason, the azomethine pigment exhibits good solubility in a non-polar solvent.

From the viewpoint described above, it is particularly preferred that, in the structure of Formula (6), $R^1$ is a hydrogen atom, an alkyl group, an alkoxy group, or an aryl group, one or both of $R^2$ and $R^3$ are a linear or branched alkyl group having 6 to 16 carbon atoms (more preferably 6 to 12 carbon atoms), and $R^8$, $R^9$ and $R^{10}$ are each independently an alkyl group having 1 to 12 carbon atoms (preferably 2 to 12 carbon atoms), a cyano group, or —COOR$^{11}$ ($R^{11}$ represents an alkyl group having 1 to 12 carbon atoms (preferably 2 to 12 carbon atoms).).

Hereinafter, specific examples of the azomethine pigments represented by Formulae (1) to (6) are described. The invention is not limited to these specific examples.

Note that, in the specific examples shown below, "Ph", "Me", "Et", "Pr" and "Bu" represent a phenyl group, a methyl group, an ethyl group, a propyl group, and a butyl group, respectively.

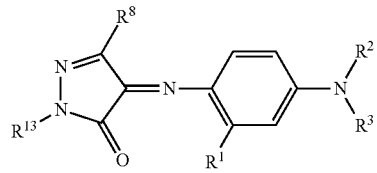

| No. | $R^{13}$ | $R^8$ | $R^1$ | $R^2$ | $R^3$ |
|---|---|---|---|---|---|
| D-1 | Ph | Me | Me | n-C$_8$H$_{17}$ | n-C$_8$H$_{17}$ |
| D-2 | i-Pr | t-Bu | Me | n-C$_8$H$_{17}$ | n-C$_8$H$_{17}$ |
| D-3 | C$_6$H$_{13}$ | EtO | MeO | CH$_2$CHEtC$_4$H$_9$ | CH$_2$CHEtC$_4$H$_9$ |
| D-4 | Ph | i-Pr | Et | n-C$_{10}$H$_{21}$ | n-C$_{10}$H$_{21}$ |
| D-5 | n-C$_8$H$_{17}$ | t-Bu | Me | Et | Et |
| D-6 | t-Bu | n-C$_8$H$_{17}$ | H | Et | Et |
| D-7 | CF$_3$ | CN | n-C$_8$H$_{17}$O | n-Bu | n-Bu |
| D-8 | Ph | CN | i-Pr | n-C$_8$H$_{17}$ | n-C$_8$H$_{17}$ |
| D-9 | CH$_2$CHEt—C$_4$H$_9$ | CF$_3$ | H | n-Bu | n-Bu |
| D-10 | 2,6-(CH$_2$)$_2$—Ph | CO$_2$Et | CF$_3$O | n-C$_8$H$_{17}$ | n-C$_8$H$_{17}$ |
| D-11 | Ph | t-Bu | Me | n-C$_6$H$_{13}$ | n-C$_6$H$_{13}$ |

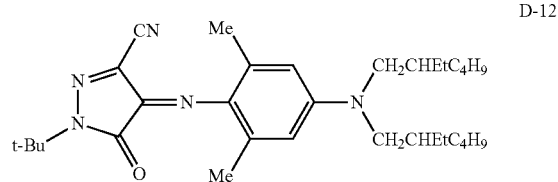

D-12

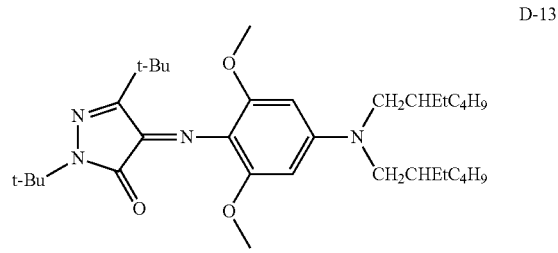

D-13

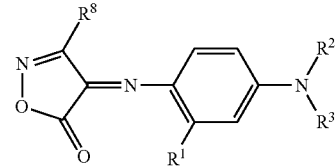

| No. | $R^8$ | $R^1$ | $R^2$ | $R^3$ |
|---|---|---|---|---|
| D-14 | Me | Me | n-C$_8$H$_{17}$ | n-C$_8$H$_{17}$ |
| D-15 | i-Pr | H | n-C$_8$H$_{17}$ | n-C$_8$H$_{17}$ |
| D-16 | C$_6$H$_{13}$ | MeO | CH$_2$CHEtC$_4$H$_9$ | CH$_2$CHEtC$_4$H$_9$ |
| D-17 | Ph | H | n-C$_{10}$H$_{21}$ | n-C$_{10}$H$_{21}$ |
| D-18 | n-C$_8$H$_{17}$ | Me | Et | Et |
| D-19 | t-Bu | H | Et | Et |
| D-20 | Ph | n-C$_8$H$_{17}$O | n-Bu | n-Bu |
| D-21 | t-Bu | Me | n-C$_8$H$_{17}$ | n-C$_8$H$_{17}$ |
| D-22 | i-Pr | H | n-Bu | n-Bu |
| D-23 | Et | Me | n-C$_6$H$_{13}$ | n-C$_6$H$_{13}$ |

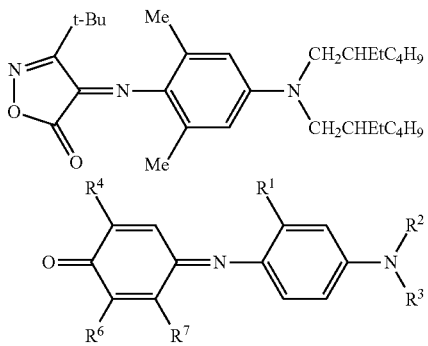

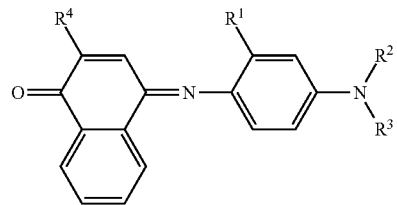

D-24

-continued

| No. | R⁴ | R¹ | R² | R³ |
|---|---|---|---|---|
| D-36 | H | H | $C_8H_{17}$ | $C_8H_{17}$ |
| D-37 | Et | H | $C_8H_{17}$ | $C_8H_{17}$ |
| D-38 | $CONHC_{16}H_{33}$ | Et | Et | Et |
| D-39 | $CONHC_{16}H_{33}$ | H | Bu | Bu |
| D-40 | $CH_2CHEtC_4H_9$ | Me | Et | Et |
| D-41 | $CO_2C_6H_{13}$ | Me | $C_{12}H_{25}$ | $C_{12}H_{25}$ |
| D-42 | $CONHC_{12}H_{25}$ | Me | Et | Et |
| D-43 | $CONHC_{18}H_{37}$ | $CH_3O$ | Et | Et |
| D-44 | $CONHC_6H_4$-4-$C_{12}H_{25}$ | Me | $C_{12}H_{25}$ | $C_{12}H_{25}$ |
| D-45 | $CON(CH_3)C_{18}H_{37}$ | H | Et | Et |
| D-46 | $CONHC_6H_5$ | Me | $C_6H_{13}$ | $C_6H_{13}$ |

| No. | R¹ | R² | R³ | R⁴ | R⁶ | R⁷ |
|---|---|---|---|---|---|---|
| D-25 | Me | n-$C_8H_{17}$ | n-$C_8H_{17}$ | H | Me | Et |
| D-26 | H | n-$C_8H_{17}$ | n-$C_8H_{17}$ | $CONHC_8H_{17}$ | Me | H |
| D-27 | H | n-$C_8H_{17}$ | n-$C_8H_{17}$ | CONH—Bal | Cl | Me |
| D-28 | $CH_3O$ | n-$C_{10}H_{21}$ | n-$C_{10}H_{21}$ | t-Bu | H | H |
| D-29 | n-$C_8H_{17}O$ | Et | Et | i-Pr | H | H |
| D-30 | Et | Et | Et | CONH—Bal | Et | Et |
| D-31 | Et | n-Bu | n-Bu | Me | Et | Me |
| D-32 | Me | n-$C_8H_{17}$ | n-$C_8H_{17}$ | t-Bu | $CO_2Et$ | H |
| D-33 | Me | n-Bu | n-Bu | $CO_2C_8H_{17}$ | H | H |
| D-34 | H | n-$C_8H_{17}$ | n-$C_8H_{17}$ | Me | Me | H |

The above "Bal" represents the following substituent.

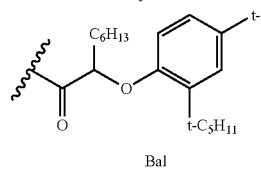

In Bal, the wave line represents a binding site.

D-47

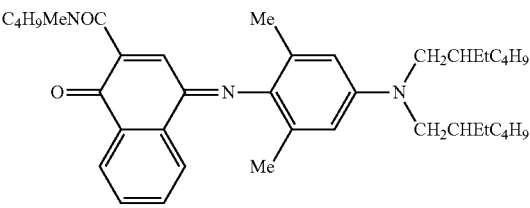

D-35

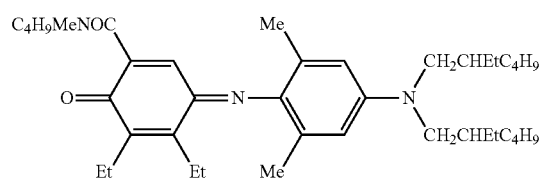

D-48

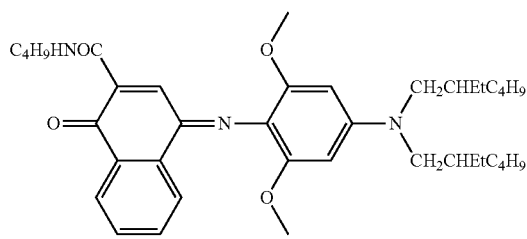

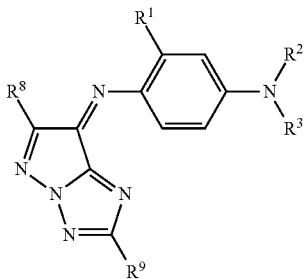

| No. | R⁹ | R⁸ | R¹ | R² | R³ |
|---|---|---|---|---|---|
| D-49 | Ph | t-Bu | Me | $C_8H_{17}$ | $C_8H_{17}$ |
| D-50 | t-Bu | t-Bu | Me | $C_8H_{17}$ | $C_8H_{17}$ |
| D-51 | $CH(CH_3)CH_2NH$—Bal2* | Me | Me | Et | Et |
| D-52 | t-Bu | CN | $CH_3O$ | $CH_2CHEtC_4H_9$ | $CH_2CHEtC_4H_9$ |

-continued

| | | | | | |
|---|---|---|---|---|---|
| D-53 | i-Pr | t-Bu | H | $C_{10}H_{21}$ | $C_{10}H_{21}$ |
| D-54 | $C_6H_{13}$ | $CO_2C_8H_{17}$ | H | $C_8H_{17}$ | $C_8H_{17}$ |
| D-55 | $CH(CH_3)CH_2NH—Bal*$ | Me | H | Et | Et |
| D-56 | t-Bu | CN | $C_6H_{13}O$ | $C_6H_{13}$ | $C_6H_{13}$ |

*The "Bal" represents the above substituent.
The above "Bal2" represents the following substituent.

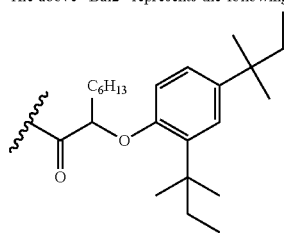

Bal2

In Bal2, the wave line represents a binding site.

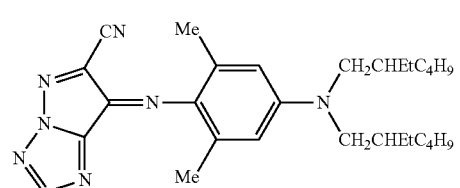

D-57

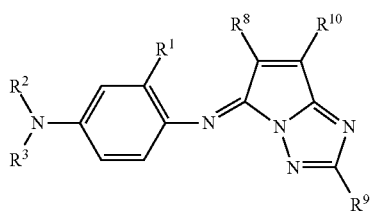

D-58

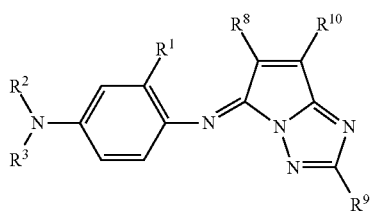

| No. | $R^9$ | $R^{10}$ | $R^8$ | $R^1$ | $R^2$ | $R^3$ |
|---|---|---|---|---|---|---|
| D-59 | 4-t-Bu—Ph | EST1 | CN | Me | $C_8H_{17}$ | $C_8H_{17}$ |
| D-60 | t-Bu | t-Bu | Me | H | $C_8H_{17}$ | $C_8H_{17}$ |
| D-61 | $C_8H_{17}$ | Me | CN | Et | $C_8H_{17}$ | $C_8H_{17}$ |
| D-62 | t-Bu | EST1 | $CH_3O$ | H | $C_{10}H_{21}$ | $C_{10}H_{21}$ |
| D-63 | i-Pr | t-Bu | CN | H | Et | Et |
| D-64 | $C_6H_{13}$ | $CO_2C_8H_{17}$ | CN | $CH_3O$ | $CH_2CHEtC_4H_9$ | $CH_2CHEtC_4H_9$ |

The above EST1 represents the following structure.

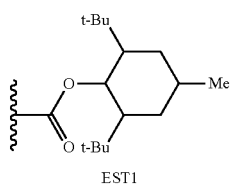 [SMILES: *C(=O)OC1C(C(C)(C)C)CC(C)CC1C(C)(C)C]

EST1

In EST1, the wave line represents a binding site.

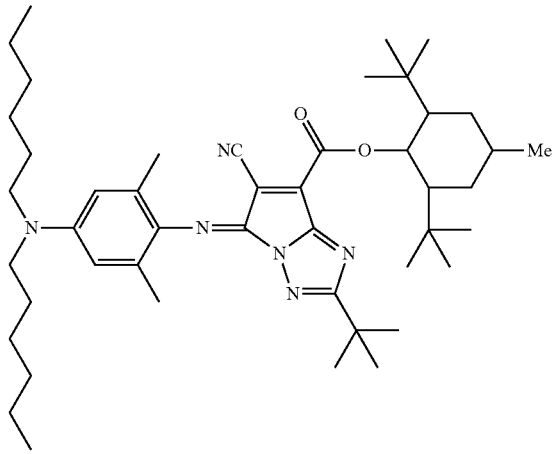

D-65

The azomethine pigment according to the invention may be synthesized in accordance with the methods described in the Journal of American Chemical Society (J. Am. Chem. Soc.), 1957, vol. 79, page 583; JP-A No. 9-100417, JP-A No. 20011-116898; JP-A No. 2011-12231; JP-A No. 2010-260941; and JP-A No. 2007-262165.

The colored composition of the invention may include an embodiment including two or more azomethine pigments in addition to an embodiment including one azomethine pigment, and when two or more azo-based pigments are included, an arbitrary ratio of the pigments may be used.

The content of the azomethine pigment represented by Formula (1) in the colored composition is not particularly limited, and the pigment may be contained at arbitrary concentration according to the purpose thereof. The content of the azomethine pigment is preferably 5% by mass or more with respect to the total mass of the composition from the viewpoint of color hue, and the azomethine pigment is more preferably contained at high concentration from the viewpoint of color hue or color concentration. Specifically, the content thereof is appropriately 10% by mass or more, more appropriately 15% by mass or more, and particularly preferably 20% by mass or more. In addition, the content thereof is preferably 25% by mass or more in terms of the viscosity of the composition. The upper limit of the content of the azomethine pigment is preferably 70%, and more preferably 50%.

When the content within the above range is applied to manufacturing a display unit such as a display device which operates in accordance with the principle of an electrowetting method or an electrophoresis method, particularly an image display material responsible for the display (a layer which switches the ON/OFF state of a pixel (optical shutter layer), or a color display layer of a display device which operates in accordance with an electrophoresis method (color filter)), a higher contrast ratio can be obtained, and a rapid response and a lower voltage can be further achieved.

When the azomethine pigment is used as a pigment for image display which operates in accordance with the principle of an electowetting method, the concentration of the azomethine pigment is generally 0.2% by mass or more, and the azomethine pigment is diluted with a non-polar solvent depending on the necessary εC value (ε is the absorption coefficient of the colored composition) and used.

The colored composition of the invention may include only the azomethine pigment represented by Formula (1), but may include a pigment other than the azomethine pigment in order to obtain a preferable color tone. For example, the azomethine pigment according to the invention may also be mixed with pigments of red and blue having a structure different from that of the azomethine pigment to form a black composition.

—Other Pigments—

Other pigments which the colored composition of the invention may include may be arbitrarily selected from the pigments having solubility and dispersibility in a non-polar solvent to the extent that the effects of the invention are not impaired.

For example, when the colored composition of the invention is used in a display using an electrowetting method, as another pigment, an arbitrary pigment may be selected from the pigments that is dissolved in a non-polar solvent such as an aliphatic hydrocarbon-based solvent, and specific examples thereof include Oil Blue N (alkylamine substituted anthraquinone), Solvent Green, Sudan Red, and Sudan Black.

—Non-Polar Solvent—

The colored composition of the invention includes at least one non-polar solvent. The non-polar solvent refers to a solvent having a small permittivity value (so-called an apolar solvent).

The non-polar solvent in the invention is a solvent dissolving the azomethine pigment, and examples thereof include an aliphatic hydrocarbon-based solvent (preferably having 6 to 30 carbon atoms) such as n-hexane, n-decane, dodecane, tetradecane, and hexadecane.

The colored composition of the invention includes a non-polar solvent, but may include other solvents which are not a non-polar solvent to the extent that the effects of the invention are not impaired.

In the invention, the content of the non-polar solvent in the colored composition of the invention is preferably 70% by mass or more and more preferably 90% by mass or more, with respect to the total amount of the solvent. When the content of the non-polar solvent is 70% by mass or more, the solubility of the azomethine pigment is favorably maintained, and in case in which the colored composition of the invention is applied to, for example, a display device which operates in accordance with the principle of an electrowetting method or an electrophoresis method, improved optical shutter properties and display contrast can be exhibited. In the invention, a composition using only a non-polar solvent as a solvent component (the ratio of the non-polar solvent with respect to the total amount of the solvent is 100% by mass) is more preferable.

—Other Components—

Moreover, the colored composition of the invention may include various arbitrary additives such as an ultraviolet absorber and an antioxidant, if necessary.

The content of the additive is not particularly limited, but the additive is generally used in an amount of approximately 20% by mass or less with respect to the total amount of the colored composition.

When the azomethine pigment according to the invention and other pigments that is used optionally is dissolved in a non-polar solvent such as the aliphatic hydrocarbon-based solvent described above and the like, the colored solution (for example: ink) for a display device which operates in accordance with the principle of an electrowetting method can be realized.

As the viscosity of the colored composition of the invention, the dynamic viscosity at 20° C. is preferably 10 mPa·s or less. In particular, the viscosity is preferably 0.01 mPa·s or more and more preferably from 0.01 mPa·s to 8 mPa·s. When the viscosity of the colored composition is 10 mPa·s or less, the composition is suitable for use as an image display material of a display device which operates in accordance with the principle of an electrowetting method or an electrophoresis method, and particularly when the composition is applied to an optical shutter in an image display which operates in accordance with the principle of an electrowetting method, the composition is preferred compared to a composition having a large viscosity because a fast response speed and low driving voltage can be realized.

Note that, the dynamic viscosity is a value measured by adjusting a solution at 10% by mass of the pigment in decane to 20° C. using a viscometer (500 TYPE, manufactured by Toki Sangyo Co., Ltd.).

The colored composition of the invention has preferably a small relative permittivity and more preferably a value in a range from 2.0 to 10.0. Within the range, the colored composition of the invention is suitable for use as an image display material for a display device which operates in accordance with the principle of an electrowetting method or an electrophoresis method, and particularly when the composition is applied to an optical shutter in an image display which operates in accordance with the principle of an electrowetting method, the composition compared to a composition having a large relative permittivity is preferred because a fast response speed and low driving voltage can be realized.

The relative permittivity is a value obtained by injecting the colored composition into a glass cell having a cell gap of 10 μm to which an indium tin oxide (ITO) transparent electrode is attached and measuring, at 20° C. and 40% RH, the electric capacitance of the cell with the colored composition thus-obtained using a TYPE 2353LCR METER (measuring frequency: 1 kHz) manufactured by NF Co., Ltd.

<Image Display Structure and Display Device>

The colored composition of the invention is useful as an image display material used in display devices such as a display, and in particular, a display device (display) which operates in accordance with the principle of an electrowetting method or a display device (display) which operates in accordance with an electrophoresis method, because the azomethine pigment included therein has excellent solubility in a non-polar solvent, in particular, a hydrocarbon-based solvent. Accordingly, the colored composition of the invention is appropriately used in the manufacture of an image display structure responsible for image display in the display devices.

The principle of an electrowetting method is described in International Publication (WO) No. 2005-098524. The principle is based on a phenomenon in which a hydrophobic oil layer disposed on a polymer having a hydrophobic surface is deformed by the application of voltage. The hydrophobic liquid (oil droplet) and the polymer solid (for example, polymer layer) are surrounded by a hydrophilic liquid ((for example, a hydrophilic electrolyte solution containing water or an electrolyte such as ethylene glycol or a tetrabutylammonium salt). In the display which operates in accordance with the principle, for example, a substance having a hydrophobic surface which has no affinity for water is used for a substrate away from the observation surface of the display in the first place, a gap between the substrate and an electrode close to the observation surface is filled with a hydrophilic liquid (for example, water) and colored oil droplets (hydrophobic liquid), and then voltage is applied. A voltage difference is generated due to the voltage applied to between the hydrophilic liquid and the electrode, and a coulombic interaction between the hydrophilic liquid and the electrode occurs due to the voltage difference, whereby the hydrophilic liquid and the electrode tend to be close to each other. For this reason, the hydrophobic liquid is deformed such that the hydrophobic liquid does not completely covers the bottom portion of the pixel and covers only a part of the pixel. The polymer layer having the hydrophobic surface preferably exhibits transparent properties, and a portion of the polymer which has not been covered with the hydrophobic liquid is transparent. The shape change of the hydrophobic liquid when the maximum voltage is applied and when the voltage is not applied can be recognized for an observer as the state of "on" or "off" of the pixel. There can be two types of displays operating in accordance with the principle: a transmission type; and a reflection type. In the case of the transmission type, the pixel is observed as "transparent" in the "on" state because oil droplets covering the surface of the hydrophobic substrate move and thus light is seen through the hydrophilic liquid, and the pixel is observed as colored or black in the "off" state, thereby generating the optical impression. In the reflection type, there is a case in which the polymer solid to be used is white or a case in which a reflective layer is used below the electrode. In the case of the reflection type, the pixel is observed as "white" in the "on" state because oil droplets covering the surface of the hydrophobic substrate move and thus the polymer solid is exposed and the white color thereof is observed through the hydrophilic liquid, and the pixel is observed as colored or black in the "off" state, thereby generating the optical impression.

As described above, the compound used for coloring oil droplets as the hydrophobic liquid is required to have good solubility in a non-polar solvent that forms a part of the oil droplets. The colored composition of the invention has good solubility in a non-polar solvent of a methine-based pigment and is suitable for the display method using an electrowetting method.

As a specific example, an image display structure including: at least, a polymer layer having a hydrophobic surface; an oil layer which is disposed in contact with the hydrophobic surface of the polymer layer and is formed using the above colored composition of the invention; and a hydrophilic liquid layer which is disposed in contact with the oil layer is suitably formed. Examples of the display device including the image display structure include an electrowetting device illustrated in FIG. 1.

As illustrated in FIG. 1, an electrowetting device 50 includes: an incident plane 21a to which light enters; an output plane 21b which is disposed to face the incident plane 21a and from which the light emits; a cell 21 which is surrounded by plural side surfaces of a side surface 21c and a side surface 21d; an electrode 14 disposed in the cell; an insulating layer (polymer layer) 13 disposed on the electrode 14; an oil layer 12 which contacts the insulating layer 13 and is filled in the cell; a hydrophilic liquid layer 11 which contacts the oil layer 12 and is filled in the cell; and a power source 25 which electrically connects the hydrophilic liquid layer 11 with the electrode 14. Furthermore, the device is equipped with a switch SW26 for ON/OFF of the power source 25 and a light source 27 which is disposed outside the cell 21 to irradiate light on the cell 21.

Since the insulating layer 13 is formed using a hydrophobic material, when the switch SW26 is off, the oil layer 12 contacts the surface of the insulating layer 13, whereby the hydrophilic liquid layer 11 and the insulating layer 13 are spaced apart from each other by the oil layer 12. On the contrary, when the switch SW26 is on, the electrode and the hydrophilic liquid layer 11 are electrically charged, and thus a coulombic interaction is generated therebetween, the affinity of the electrode 14 for the hydrophilic liquid layer 11 is increased, and the oil layer 12 moves in a direction so as to minimize the contact surface with the insulating layer 13. Here, the oil layer 12 is formed using the above-described colored composition of the invention, and thus is favorably changed into the color of the oil layer 12 when the switch SW26 is off, and is changed into a transparent display when the switch SW26 is on. At this time, the hydrophilic liquid layer 11 may be colored as a desired color such as red, green, or blue, and it is possible to display two colors by a color of the oil layer and the hydrophilic liquid layer and a color of the hydrophilic liquid phase. Further, plural cells that shows a desired color (for example, RGB three primary colors) generated by variously combining colors of the hydrophilic liquid layer and the oil layer is disposed on a pixel and by selectively supplying the voltage to the cell unit is selectively supplied, whereby a colored image is also possibly displayed. Further, in a case in which the color of the oil layer 12 is black, light is blocked when the switch SW26 is off, and the light emitting from the light source 27 reaches the output plane 21b to display white when the switch SW26 is on, whereby it is possible to display black and white.

The electrowetting technology in the display has many advantages such as low energy consumption compared to other display technologies and rapid change of the display state of the pixel (reduction in changeover time) which is essential in the display of motion pictures. In addition, the coloring property of the pixel is ensured by a coloring material dissolved in the hydrophobic liquid, and thus the pixel of the display can exhibit various colors. The coloring material needs to be insoluble in the hydrophilic liquid. For this reason, it is possible to realize a transmission type display based on red (R), green (G), blue (B) and black or a reflection type display based on cyan (C), magenta (M), yellow (Y) and black.

The size of the coulombic interaction between the electrode and the hydrophilic liquid is proportional to the voltage applied. Accordingly, various gray scales may be expressed in the pixel according to the voltage, and a high quality image can be produced in the display.

Electrowetting may also be used in technologies of an optical filter, a adaptive lens and a lab-on-a-chip in addition to a display.

Furthermore, an electrophoresis method is a principle based on a phenomenon in which particles electrically charged which is dispersed in a solvent are moved by an electric field, and is advantageous in that electric power consumption is saved and there is no viewing angle dependency.

In the display which operates in accordance with the principle of an electrophoresis method, a dispersion liquid in which particles electrically charged are added and dispersed into a colored solution (an image display structure responsible for a color display function (for example, color filter)) is disposed between a pair of two substrates and a voltage of approximately several volts is applied to between the substrates so that the particles move in the liquid phase, thereby displaying an image. For example, a display is configured to include an image display structure (so-called color filter) responsible for color display formed by using the colored composition of the invention as in a colored solution and disposing, between a pair of two substrates, a microcapsulated dispersion liquid in which particles with electrically-charged are dispersed. The colored composition of the invention has good solubility of an azomethine pigment in a non-polar solvent and is suitable for the display method using the electrophoresis method.

EXAMPLES

Hereinafter, the invention is described in more detail with reference to examples, but the invention is not limited to the following examples as long as the gist thereof is not altered. Unless particularly specified, "parts" are based on mass.

Examples 1 to 13

—1. Preparation of Colored Solution—
Azomethine pigments (preparing the above exemplified compounds D-1, D-5, D-11, D-20, D-26, D-38, D-43, D-46, D-49, D-55, D-56, D-57 and D-65 shown in the following Table) and n-hexane as an organic solvent were mixed to prepare a 15% by mass azomethine pigment-n-hexane solution (colored composition), thereby manufacturing 13 kinds of colored solutions.

For each of the colored solutions manufactured, the color, absorption maximum wavelength ($\lambda_{max}$), absorbance (abs), absorption coefficient ($\epsilon$) and solubility (% by mass) of each azomethine pigment in n-hexane were measured and evaluated. The measurement and evaluation results are shown in the following Tables 1 to 6.

—2. Measurement Evaluation—
(1) Color
Each colored solution (colored composition) was observed with the naked eye to determine the color.
(2) Absorption Maximum Wavelength, Absorbance and Absorption Coefficient
For the colored solution (colored composition), the absorption maximum wavelength ($\lambda_{max}$) and the absorbance were measured with a visible light absorbance spectrometer (UV-1800PC, manufactured by Shimadzu Corporation) and the absorption coefficient ($\epsilon$) was calculated in accordance with the Lambert-Beer law.
(3) Solubility in n-Hexane
The solubility of each azomethine pigment in n-hexane, which is a non-polar solvent, was measured by the following method.
Each pigment was dissolved in n-hexane that had been heated to 50° C. to prepare a saturated solution, and then the saturated solution obtained was left to stand in an environment of 0.1 MPa at 25° C. for 1 hour. The precipitated pigment was filtered and the precipitation amount was measured, thereby calculating the solubility (% by mass) of each pigment in n-hexane at 25° C. and 0.1 MPa.
(4) Measurement of Dynamic Viscosity
For the azomethine pigments shown in the following Table 7, a solution of 10% by mass of each pigment in decane was prepared and an R-type viscometer (500 TYPE, manufactured by Toki Sangyo Co., Ltd.) was used to measure the viscosity thereof at 20° C. The measurement results of the viscosity are shown in the following Table 7.
(5) Measurement of Relative Permittivity
The azomethine pigments shown in the following Table 7 were prepared and solutions of 5% by mass, 7.5% by mass and 10% by mass of each pigment dissolved in n-hexane (all were colored solutions) were prepared. Each colored solution obtained was injected into a glass cell having a cell gap of 10 μm to which an indium tin oxide (ITO) transparent electrode was attached. For each of the glass cells, the electric capacitance was measured (measuring frequency: 1 kHz). Further, a cell for reference was prepared by injecting only n-hexane into a glass cell which was the same kind of glass cell as described above, and the electric capacitance of the cell for reference was also measured. The electric capacitance of the cell obtained was measured at 20° C. and 40% RH using a type 2353LCR meter (measuring frequency: 1 kHz) manufacture by NF Co., Ltd.
The relative permittivity of each colored solution was obtained by the above measurement, and the relative permittivity of each azomethine pigment itself was calculated from the above relative permittivity by extrapolation.
When the azomethine pigment is applied to a display device which operates in accordance with the principles of an electrowetting method or an electrophoresis method, the value of the relative permittivity of the azomethine pigment is preferably lower because the electrical durability is thereby improved.

Comparative Examples 1 to 6

The colored solution (colored composition) was prepared in the same manner as in Example 1, except that exemplified compound D-1 used as the pigment was changed to the following compounds D-101 to D-106, respectively. The color, absorption maximum wavelength, absorbance, absorption coefficient and solubility of the colored solution obtained were measured and evaluated. The measurement and evaluation results are shown in the following Tables 1 to 6.

TABLE 1

| | Pigment | Solvent | Solution color | Solubility (% by mass) | Absorption coefficient ($\epsilon$) | Absorption maximum wavelength [$\lambda_{max}$] |
|---|---|---|---|---|---|---|
| Example 1 | D-1 | n-hexane | Orange | 9.5 | $6.05 \times 10^4$ | 500 nm |
| Example 2 | D-5 | n-hexane | Red-orange | 8.5 | $5.20 \times 10^4$ | 502 nm |
| Example 3 | D-11 | n-hexane | Orange | 1.1 | $5.60 \times 10^4$ | 502 nm |
| Comparative Example 1 | D-101 | n-hexane | Hardly colored | 0.05 or less | — | — |

Comparative Compound D-101

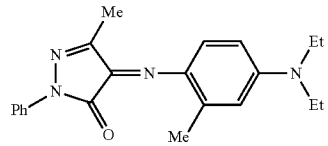 [SMILES: CCN(CC)c1ccc(N=C2C(=O)N(c3ccccc3)N=C2C)c(C)c1]

TABLE 2

| | Pigment | Solvent | Solution color | Solubility (% by mass) | Absorption coefficient ($\epsilon$) | Absorption maximum wavelength [$\lambda_{max}$] |
|---|---|---|---|---|---|---|
| Example 4 | D-20 | n-hexane | Orange | 15.0 or more | $4.80 \times 10^4$ | 480 nm |
| Comparative Example 2 | D-102 | n-hexane | Hardly colored | 0.05 or less | — | — |

Comparative Compound D-102

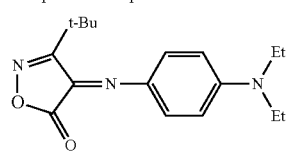

TABLE 3

| | Pigment | Solvent | Solution color | Solubility (% by mass) | Absorption coefficient ($\epsilon$) | Absorption maximum wavelength [$\lambda_{max}$] |
|---|---|---|---|---|---|---|
| Example 5 | D-26 | n-hexane | Blue | 15.0 or more | $2.8 \times 10^4$ | 626 nm |
| Comparative Example 3 | D-103 | n-hexane | Hardly colored | 0.05 or less | — | — |

Comparative Compound D-103

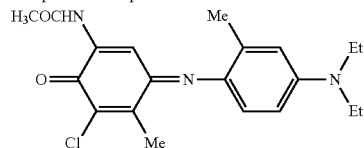

TABLE 4

| | Pigment | Solvent | Solution color | Solubility (% by mass) | Absorption coefficient ($\epsilon$) | Absorption maximum wavelength [$\lambda_{max}$] |
|---|---|---|---|---|---|---|
| Example 6 | D-38 | n-hexane | Blue | 13 | $2.9 \times 10^4$ | 630 nm |
| Example 7 | D-43 | n-hexane | Blue | 15.0 or more | $2.6 \times 10^4$ | 658 nm |
| Example 8 | D-46 | n-hexane | Blue | 1.8 | $2.8 \times 10^4$ | 635 nm |
| Comparative Example 4 | D-104 | n-hexane | Hardly colored | 0.05 or less | — | — |

Comparative Compound D-104

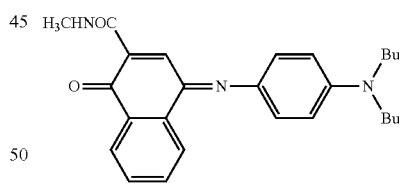

TABLE 5

| | Pigment | Solvent | Solution color | Solubility (% by mass) | Absorption coefficient ($\epsilon$) | Absorption maximum wavelength [$\lambda_{max}$] |
|---|---|---|---|---|---|---|
| Example 9 | D-49 | n-hexane | Orange | 11 | $7.2 \times 10^4$ | 518 nm |
| Example 10 | D-57 | n-hexane | Red | 12.3 | $7.55 \times 10^4$ | 540 nm |
| Example 11 | D-56 | n-hexane | Red | 3.5 | $7.2 \times 10^4$ | 550 nm |

TABLE 5-continued

| | Pigment | Solvent | Solution color | Solubility (% by mass) | Absorption coefficient (ε) | Absorption maximum wavelength [λ$_{max}$] |
|---|---|---|---|---|---|---|
| Comparative Example 5 | D-105 | n-hexane | Hardly colored | 0.05 or less | — | — |

Comparative Compound D-105

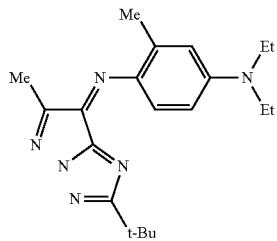 [SMILES: CCN(CC)c1ccc(/N=C(C(C)=N)\C(N)=N\C(=N)C(C)(C)C)c(C)c1]

TABLE 6

| | Pigment | Solvent | Solution color | Solubility (% by mass) | Absorption coefficient (ε) | Absorption maximum wavelength [λ$_{max}$] |
|---|---|---|---|---|---|---|
| Example 12 | D-55 | n-hexane | Blue | 3.2 | $9.2 \times 10^4$ | 614 nm |
| Example 13 | D-65 | n-hexane | Green | 15.0 or more | $6.8 \times 10^4$ | 725 nm |
| Comparative Example 6 | D-106 | n-hexane | Hardly colored | 0.05 or less | — | — |

Comparative Compound D-106

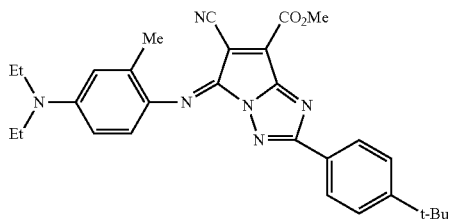 [SMILES: CCN(CC)c1ccc(/N=C2\C(C#N)=C(C(=O)OC)c3nc(-c4ccc(C(C)(C)C)cc4)nn32)c(C)c1]

TABLE 7

| Pigment | Viscosity (20° C.) [mPa · s] | Relative permittivity |
|---|---|---|
| D-1 | 1.3 | 8.6 |
| D-20 | 1.2 | 8.8 |
| D-26 | 1.4 | 6 |
| D-38 | 1.5 | 4.4 |
| D-43 | 1.5 | 4.7 |
| D-49 | 1.2 | 6.7 |
| D-57 | 1.2 | 6.2 |

As shown in Tables 1 to 6, the azomethine pigments according to the invention exhibit high solubility in hexane, which is a hydrocarbon-based solvent. In addition, the colored solution (colored composition) manufactured has a large absorption coefficient.

Accordingly, the colored composition according to the invention is suitable for use as a display device which operates in accordance with the principles of an electrowetting method or a display device which operates in accordance with an electrophoresis method, and excellent ON/OFF properties (so-called optical shutter properties) of an image display can be expected when the composition is applied to a display.

As shown in the above Table 7, the azomethine pigments according to the invention exhibit low viscosity. The colored compositions according to the invention have low viscosity despite a high pigment concentration. Therefore, when the composition is applied, for example, to a display device which operates in accordance with the principles of an electrowetting method or an electrophoresis method and, in particular, when the composition is applied to an optical shutter in an image display which operates in accordance with the principles of an electrowetting method, a high contrast ratio, rapid response speed and low voltage can be achieved. In addition, the value of the relative permittivity of the azomethine pigment according to the invention is high, as shown in the above Table 7, and in view also of this point, the azomethine pigment is suitably applied to a display device which operates in accordance with the principle of an electrowetting method or an electrophoresis method.

As described above, the colored composition according to the invention is suitable for use as a color filter of a display device which operates in accordance with the principles of an electrowetting method or an electrophoresis method.

Example 14

Ingredients in the following composition were mixed to manufacture a black solution having an azomethine pigment concentration of 51% by mass.

<Composition>

Azomethine pigment (above-described exemplified compound D-20): 260 mg
Azomethine pigment (above-described exemplified compound D-49): 200 mg
Azomethine pigment (above-described exemplified compound D-57): 160 mg
Azomethine pigment (above-described exemplified compound D-43): 300 mg
Azomethine pigment (above-described exemplified compound D-55): 100 mg
n-decane: 980 mg As a result of measuring the dynamic viscosity in the same manner as in Example 1, the dynamic viscosity shows a low value of 7.9 mPa·s. Therefore, for example, when the solution is applied to a display device which operates in accordance with the principles of an electrowetting method or an electrophoresis method, a high contrast ratio and rapid response speed can be obtained.

Example 15

Ingredients in the following composition were mixed to manufacture a black solution having an azomethine pigment concentration of 37% by mass.

<Composition>

The following pigment Y-1: 280 mg
Azomethine pigment (above-described exemplified compound D-5): 180 mg
Azomethine pigment (above-described exemplified compound D-57): 160 mg
Azomethine pigment (above-described exemplified compound D-43): 300 mg Azomethine pigment (above-described exemplified compound D-55): 100 mg
n-decane: 980 mg
Pigment Y-1

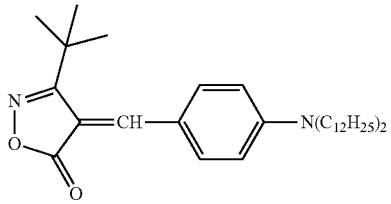

As a result of measuring the dynamic viscosity in the same manner as in Example 1, the dynamic viscosity shows a low value of 7.5 mPa·s. Therefore, for example, when the solution is applied to a display device which operates in accordance with the principles of an electrowetting method or an electrophoresis method, a high contrast ratio and rapid response speed can be obtained.

Examples 16 to 30

As shown in FIG. 1, an electrowetting device was manufactured by preparing a cell in which an ITO electrode 12 and an insulating layer 13 including a fluorine polymer (CYTOP, manufactured by Asahi Glass Co., Ltd.) were sequentially disposed, filling each of the colored solutions and black solutions manufactured in Examples 1 to 15 into the cell, and filling a sodium chloride aqueous solution or ethylene glycol (hydrophilic liquid) thereon.

The electrowetting device manufactured exhibits excellent ON/OFF properties (so-called optical shutter properties) of the display during image display.

INDUSTRIAL APPLICABILITY

The colored composition according to the invention is suitably used in display devices such as a display and the like, and among these, in a display device which operates in accordance with the principles of an electrowetting method or a display device which operates in accordance with an electrophoresis method.

The invention claimed is:

1. A colored composition comprising:
an azomethine pigment represented by the following Formula (1) and having a solubility in n-hexane of 1% by mass or more at 25° C. and 0.1 MPa; and
a non-polar solvent,
wherein the azomethine pigment has at least one linear or branched alkyl group having 6 to 30 carbon atoms in a molecule thereof:

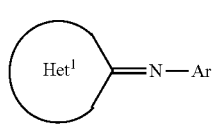

Formula (1)

wherein, in Formula (1), $Het^1$ represents a ring having no dissociable group and Ar represents an aromatic ring having no dissociable group or a saturated heterocycle having no dissociable group.

2. The colored composition according to claim 1, wherein the azomethine pigment is a compound represented by the following Formula (2):

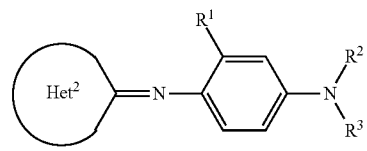

Formula (2)

wherein, in Formula (2), $Het^2$ represents a coupler mother nucleus having no dissociable group; $R^1$ represents a hydrogen atom, an alkyl group, an alkoxy group, or an aryl group; $R^2$ and $R^3$ each independently represent an alkyl group or an aryl group; and none of $R^1$, $R^2$ and $R^3$ has a dissociable group.

3. The colored composition according to claim 1, wherein the azomethine pigment is a compound represented by at least one selected from the group consisting of the following Formula (3), Formula (4), Formula (5) and Formula (6):

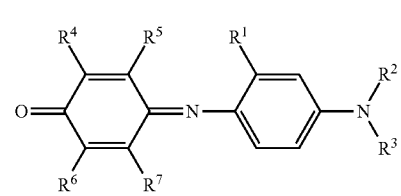

Formula (3)

wherein in Formula (3), $R^1$ represents a hydrogen atom, an alkyl group, an alkoxy group, or an aryl group; $R^2$ and $R^3$ each independently represent an alkyl group or an aryl group; $R^4$, $R^5$, $R^6$ and $R^7$ each independently represent a hydrogen atom, an alkyl group, an alkoxy group, an aryl group, —$COOR^{11}$, or —$CONR^{11}R^{12}$; $R^4$, $R^5$, $R^6$ and $R^7$ may be combined with each other to form an aromatic ring; $R^{11}$ represents an alkyl group or an aryl group and $R^{12}$ represents a hydrogen atom, an alkyl group, or an aryl group; $R^{11}$ and $R^{12}$ may be combined with each other to form a 5-membered ring, a 6-membered ring, or a 7-membered ring; and none of $R^1$ to $R^7$ has a dissociable group;

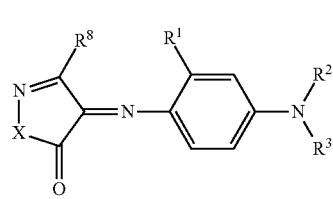

Formula (4)

wherein in Formula (4), $R^1$ represents a hydrogen atom, an alkyl group, an alkoxy group, or an aryl group; $R^2$ and $R^3$ each independently represent an alkyl group or an aryl group; $R^8$ represents an alkyl group, an alkoxy group, an aryl group, a cyano group, —$COOR^{11}$, or —$CONR^{11}R^{12}$; X represents an oxygen atom or N—$R^{13}$; $R^{11}$ represents an alkyl group or an aryl group, and $R^{12}$ and $R^{13}$ each independently represent a hydrogen atom, an alkyl group, or an aryl group; $R^{11}$ and $R^{12}$ may be combined with each other to form a 5-membered ring, a 6-membered ring, or a 7-membered ring; and none of $R^1$ to $R^3$ and $R^8$ has a dissociable group;

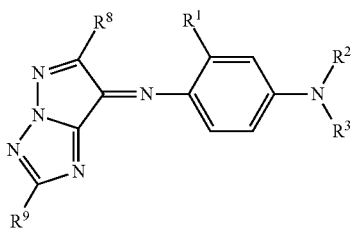

Formula (5)

wherein in Formula (5), $R^1$ represents a hydrogen atom, an alkyl group, an alkoxy group, or an aryl group; $R^2$ and $R^3$ each independently represent an alkyl group or an aryl group; $R^8$ and $R^9$ each independently represent an alkyl group, an alkoxy group, an aryl group, a cyano group, —$COOR^{11}$, or —$CONR^{11}R^{12}$; $R^{11}$ represents an alkyl group or an aryl group and $R^{12}$ represents a hydrogen atom, an alkyl group, or an aryl group; $R^{11}$ and $R^{12}$ may be combined with each other to form a 5-membered ring, a 6-membered ring, or a 7-membered ring; and none of $R^1$ to $R^3$ and $R^8$ to $R^9$ has a dissociable group; and

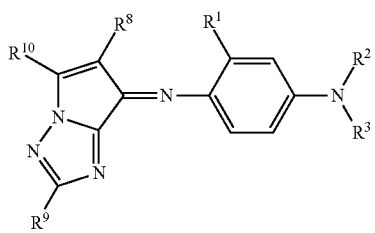

Formula (6)

wherein in Formula (6), $R^1$ represents a hydrogen atom, an alkyl group, an alkoxy group, or an aryl group; $R^2$ and $R^3$ each independently represent an alkyl group or an aryl group; $R^8$ and $R^9$ each independently represent an alkyl group, an alkoxy group, an aryl group, a cyano group, —$COOR^{11}$, or —$CONR^{11}R^{12}$; $R^{10}$ represents an alkyl group, an alkoxy group, an aryl group, —$COOR^{11}$, or —$CONR^{11}R^{12}$; $R^{11}$ represents an alkyl group or an aryl group and $R^{12}$ represents a hydrogen atom, an alkyl group or an aryl group; $R^{11}$ and $R^{12}$ may be combined with each other to form a 5-membered ring, a 6-membered ring, or a 7-membered ring; and none of $R^1$ to $R^3$ and $R^8$ to $R^{10}$ has a dissociable group.

4. The colored composition according to claim 1, wherein a viscosity of the colored composition at 20° C. is 10 mPa·s or less.

5. A display device, comprising an image display material containing the colored composition of claim 1, wherein the display device operates in accordance with a principle of an electrowetting method or an electrophoresis method.

6. An image display structure comprising:
a hydrophobic polymer layer having a hydrophobic surface;
an oil layer which is disposed in contact with the hydrophobic surface and is formed utilizing the colored composition according to claim 1; and
a hydrophilic liquid layer which is disposed in contact with the oil layer.

* * * * *